United States Patent [19]

Lebby et al.

[11] Patent Number: 5,491,491
[45] Date of Patent: Feb. 13, 1996

[54] PORTABLE ELECTRONIC EQUIPMENT WITH BINOCULAR VIRTUAL DISPLAY

[75] Inventors: Michael S. Lebby, Apache Junction; Karen E. Jachimowicz, Laveen, both of Ariz.

[73] Assignee: Motorola, Schaumburg, Ill.

[21] Appl. No.: 332,170

[22] Filed: Oct. 31, 1994

[51] Int. Cl.⁶ .................................................. G09G 3/22
[52] U.S. Cl. ........................................................ 345/7
[58] Field of Search ........................ 345/7–9; 348/52–54

[56] References Cited

U.S. PATENT DOCUMENTS

| | | | |
|---|---|---|---|
| 4,575,722 | 3/1986 | Anderson | 345/8 |
| 5,003,300 | 3/1991 | Wells | 345/8 |
| 5,153,569 | 10/1992 | Kawamura et al. | 345/8 |
| 5,311,203 | 5/1994 | Norton | 345/8 |
| 5,369,415 | 11/1994 | Richard et al. | 345/7 |

*Primary Examiner*—Jeffery Brier
*Attorney, Agent, or Firm*—Eugene A. Parsons

[57] ABSTRACT

A portable data source with a binocular virtual image display includes a pair of viewing apertures positioned for binocular viewing, image generation apparatus operably attached to receive data from the data source, and the image generation apparatus including an array of at least 100 by 100 LEDs for providing, from the received data, a real image including either a plurality of lines of alpha-numerics, graphics, or both. The real image has a luminance of less than 15 fL. A fixed optical system produces, from the real image, a pair of virtual images one each perceivable through the pair of viewing apertures.

31 Claims, 4 Drawing Sheets

PORTABLE ELECTRONIC EQUIPMENT WITH BINOCULAR VIRTUAL DISPLAY

FIELD OF THE INVENTION

The present invention pertains to portable electronic equipment and more specifically to binocular virtual displays suitable for use in portable electronic equipment.

BACKGROUND OF THE INVENTION

Portable electronic devices including communication receivers, such as radios, cellular and cordless telephones, pagers and the like, and data banks and other data sources, are becoming increasingly popular. In many instances it is desirable to provide a visual display on the receiver to supply the operator with a visual message. The problem is that prior art visual displays require relatively high electrical power and require a great amount of area to be sufficiently large to produce a useful display. In all direct view displays, for example, the size of the display is the size of image that the operator sees. Thus, to provide an image with sufficient size so that the operator can easily and comfortably understand the information being communicated, either the display must be extremely large, thereby increasing the size of the portable electronic device or the information contained in the image must be substantially reduced.

In the prior art, for example, it is common to provide visual displays utilizing liquid crystal displays, directly viewed light emitting diodes, etc. These produce very large and cumbersome displays that greatly increase the size of the receiver and require relatively large amounts of power. In U.S. Pat. No. 5,034,809, entitled "Personal Video Viewing Apparatus", for example, the apparatus includes liquid crystal displays and is so large it must be constructed so that the total weight of the display apparatus is supported mainly on the whole of the forehead.

In another instance, the prior art includes a scanning mirror to produce a larger visual display from one or two rows of LEDs but again this requires relatively large amounts of power and is very complicated and sensitive to shock. Thus, such scanning mirrors are not acceptable for portable electronic devices that may be dropped or otherwise roughly handled. Also, the scanning mirror causes vibration in the unit which substantially reduces visual comfort and acceptability.

Also, in the viewing apparatus disclosed in the above described '809 Patent, a pair of apparatus, each including optics and a liquid crystal display, are combined in a single structure to provide binocular and/or stereoscopic vision. However, the main problems which this structure is designed to overcome is the fatigue experienced when watching images on a stationary video display for long periods of time.

Accordingly, a small, rugged display with binocular vision for use in portable electronic equipment would be very useful.

It is a purpose of the present invention to provide a new and improved binocular virtual display.

It is another purpose of the present invention to provide a new and improved binocular virtual display which is useful in combination with portable electronic equipment.

It is still another purpose of the present invention to provide a new and improved binocular virtual display which utilizes very low electrical power.

It is a further purpose of the present invention to provide a new and improved binocular virtual display which is easily incorporated into portable electronic equipment without substantially increasing the size, power requirements, or weight of the portable electronic equipment.

It is a still further purpose of the present invention to provide a new and improved binocular virtual display with enhanced display capabilities.

SUMMARY OF THE INVENTION

The above problems and others are at least partially solved and the above purposes and others are realized in a portable electronic device with binocular virtual display including a portable data source, and a miniature binocular virtual image display. The miniature binocular virtual image display having a pair of viewing apertures positioned for binocular viewing, with image generation apparatus operably attached to the portable data source for receiving data therefrom. The image generation apparatus includes a two-dimensional array of LEDs, greater than 100 LEDs by 100 LEDs, for providing, from the received data, a real image of either a plurality of lines of alpha-numerics, graphics, or both, with the real image having a luminance of less than approximately 15 fL. The miniature binocular virtual image display further includes a fixed optical system for producing, from the real image, a pair of virtual images one each perceivable through the pair of viewing apertures.

Because a virtual image is utilized, rather than a direct view image and, therefore, the amount of generated light can be very low, the amount of electrical power is low and the size of the chip and the display is very small.

BRIEF DESCRIPTION OF THE DRAWINGS

Referring to the drawings.

DESCRIPTION OF THE PREFERRED EMBODIMENTS

Figure 1:
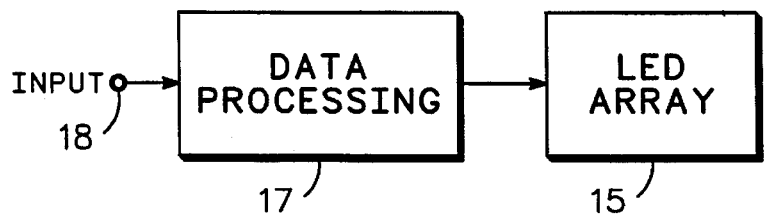
FIG. 1 is a simplified block diagram of electronics associated with a miniature virtual image display.

Referring specifically to FIG. 1, a simplified block diagram of apparatus 10 utilized to generate a complete real image is illustrated. Apparatus 10 includes, for example, semiconductor electronics such as a two dimensional light emitting device (LED) array 15 driven by data processing circuits 17. Each LED in array 15 includes one or more semiconductor devices, such as inorganic or organic light emitting diodes, electroluminescent, or fluorescent devices, vertical cavity surface emitting lasers, field emission devices, etc. Data processing circuits 17 include, for example, logic and switching circuit arrays for controlling and addressing each LED in LED array 15. Data processing circuits 17 include, in addition to or instead of the logic and switching arrays, a microprocessor or similar circuitry for processing input signals to produce a desired real image on a device such as LED array 15. While the simplified block diagram of FIG. 1 illustrates LED array 15 separate from data processing electronics 17, it should be noted that all of this circuitry can be formed on a single semiconductor chip in some specific applications.

Figure 2:
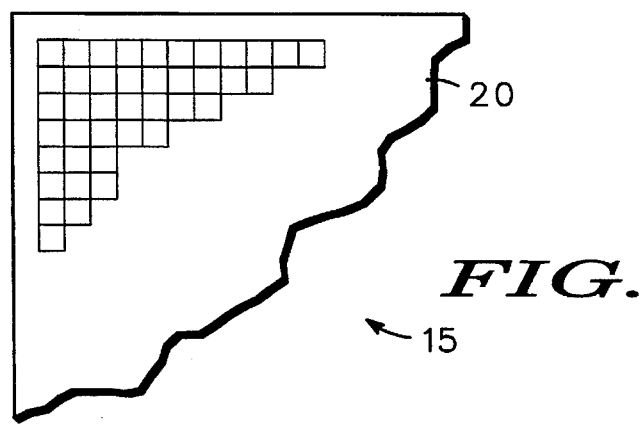
FIG. 2 is an enlarged view in top plan of an LED array, portions thereof broken away, forming a portion of the electronics of FIG. 1.

In this specific embodiment LED array 15 is utilized because of the extremely small size that can be achieved and because of the simplicity of construction and operation. Referring specifically to FIG. 2, a plan view of LED array 15 is illustrated in which pixels are formed in a regular pattern of rows and columns on a single substrate 20, which may be, for example, a semiconductor chip, glass for organic devices, etc. Each pixel includes at least one LED, with additional parallel LEDs being included, if desired, for additional brightness, redundancy, and/or color. By addressing specific pixels by row and column in a well known manner, the specific pixels are energized to produce a complete real image. Digital or analog data is received from a data source at input terminal 18 and converted by data processing circuits 17 into signals capable of energizing selected pixels to generate the predetermined complete real image.

It will be understood by those skilled in the art that LED array 15 and semiconductor chip 20 are greatly enlarged in FIGS. 1 and 2. The actual size of semiconductor chip 20 is on the order of a few milli-meters along each side with each LED being on the order of as little as 5 to 50 microns on a side, or diameter if the LEDs are round (depending upon the number of LEDs incorporated). Here it will be understood that real images formed by LED array 15 on semiconductor chip 20 will be too small to easily perceive by a human eye, even though the real image formed can have as many pixels as high definition television and can actually have as high or higher definition. Thus, details of the real image can not be seen, or perceived, where the term "perceive" means the ability to read and/or understand the displayed information, for example, a page of text. As the semiconductor technology improves and increases, the size of each semiconductor device becomes smaller (less than 5 microns across) and the overall size of semiconductor chips increases (as much as an inch along at least one of the sides presently). However, the processing complexity and yield of such extremely large semiconductor chips suffers with the size increase.

Because of the extremely small size of substrate 20, drive lines or metal connecting traces between LEDs, have a very small cross-section, which severely limits their current carrying capacity, or current density. Referring to FIG. 2 for example, in one typical operation, only a row at a time is addressed or "turned ON". Thus, the metal trace for each column needs to carry only sufficient current for one LED (the one LED in the row which is ON). However, all of the LEDs in the ON row could potentially be turned ON simultaneously. Thus, the metal trace for the ON row, which can potentially be required to carry current for however many LEDs are in the row (e.g. 100 to 1500 LEDs), must carry many times as much current as the column metal traces.

It has been found that a direct view display needs a higher luminance (brightness) than a virtual image display to be visible in the same light conditions. The reason for this goes back to the sensitivity of the human eye and the fact that what our eye sees is "luminance contrast", rather than just luminance. Direct view displays need about 25 foot-Lamberts (fL) to be visible in office environments, and more than 100 fL to be visible in outdoor environments, because they compete with the luminance of the environment, and reflect ambient light from their surface, both of which lower the visible luminance contrast of the display. Luminance is a measure of power/unit area/unit steradian, and is stressed herein as a reliable measurement of the viewability of a display. Further, luminance is directly dependent upon the amount of current supplied to each LED and is, therefore, directly dependent upon the size of the LED array. By reducing the amount of luminance required for the proper operation of the display, the size of the LED array can be reduced and, consequently, the size of the entire display.

We have found, through a great deal of experimentation, that a virtual display needs 2 fL to be visible in an office environment, and no more than 10 fL to be visible in outdoors environments. Thus, it is believed that the virtual displays disclosed herein can be conveniently limited to an upper maximum of approximately 15 fL. The background of the virtual display is very dark, as opposed to the light background of the environment in direct view displays. Also, the virtual display does not have any ambient light reflecting off its surface to lower luminance contrast (the optics limit the light falling on the display element). Because the required luminance of the virtual displays disclosed herein is very low, the amount of electrical current density required to drive the LED array is low and the present LED arrays can be fabricated much smaller than arrays used in direct view displays.

Figure 5:
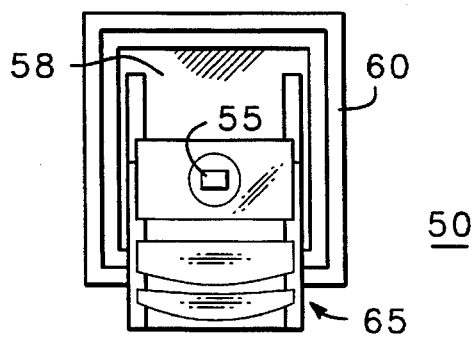
FIG. 5 illustrate a top plan view of a miniature virtual image display, approximately the actual size, in accordance with the present invention.
Figure 3:
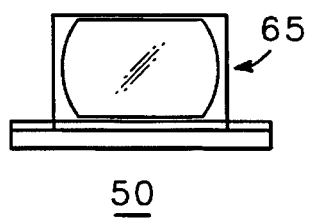
FIG. 3 illustrate a front view of a miniature virtual image display, approximately the actual size, in accordance with the present invention.
Figure 4:
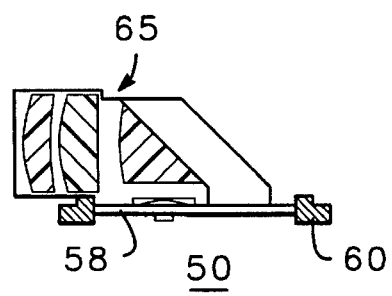
FIG. 4 illustrate a side elevational view of a miniature virtual image display, approximately the actual size, in accordance with the present invention.

FIGS. 3, 4 and 5 illustrate a front view, side elevational view, and top plan, respectively, of a miniature virtual image display 50 in accordance with the present invention. FIGS. 3, 4 and 5 illustrate miniature virtual image display 50 approximately the actual size to provide some indication as to the extent of the reduction in size achieved by the present invention. Display 50 includes a two dimensional LED array 55 which includes, in this specific embodiment, 144 light emitting diodes by 240 light emitting diodes. Each light emitting diode is fabricated approximately 20 microns on a side with a spacing between adjacent diodes of no more than 20 microns. Each light emitting diode is turned ON with approximately 1.8 volts and utilizes approximately 50 μA of current when it is turned ON. LED array 55 produces a luminance less than approximately 15 fL.

LED array 55 generates a real image which contains alpha-numerics and/or graphics and may, for example, include a full page of text (8.5"×11"), photographs, drawings, maps. Because of the extremely small size of LED array 55 the real image is generally too small to be perceived by the operator, although some minor portions or images might be recognized by a person with an acute eye.

LED array 55 is mounted on the under-surface of a glass substrate 58 and a driver board 60 is bump-bonded to substrate 58. An optical system 65 is also mounted on substrate 58 and magnifies the image approximately 20× to produce a virtual image approximately the size of an 8.5"× 11" sheet of paper.

Here it should be noted that because of the very small LED array 55 and the fact that a virtual image is utilized, rather than a direct view display, the overall physical dimensions of miniature virtual image display 50 are approximately 1.5 inches (3.8 cm) wide by 0.75 inches (1.8 cm) high by 1.75 inches (4.6 cm) deep, or a total volume of approximately 2 cubic inches (32 cm$^3$).

Figure 6:
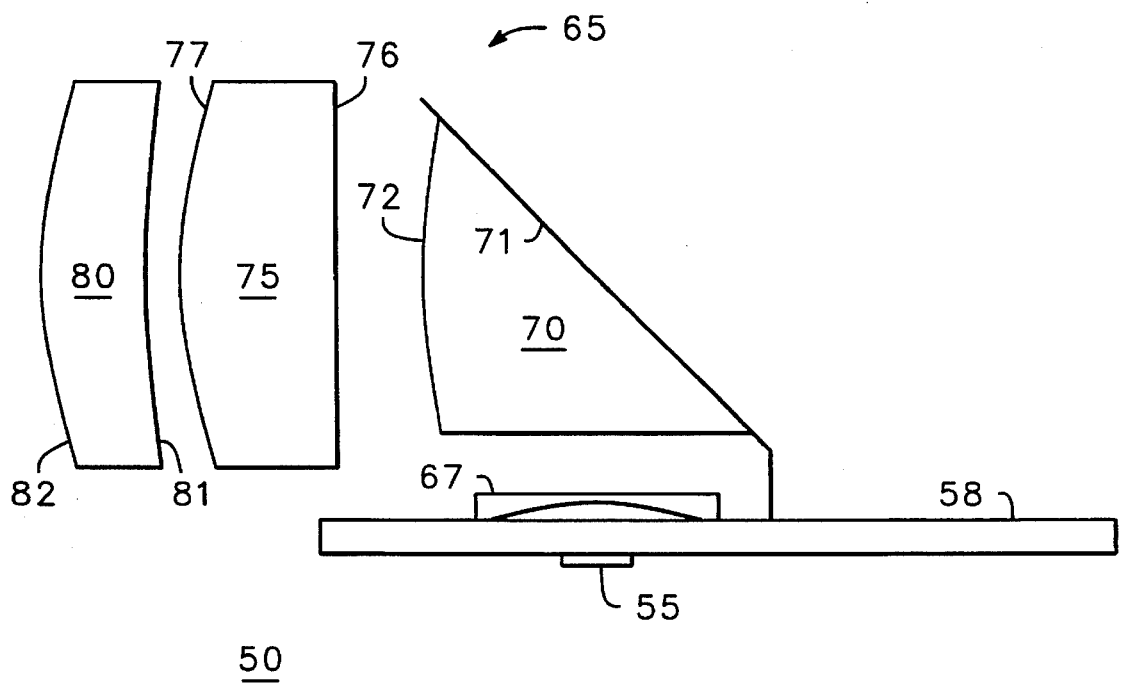
FIG. 6 is a 4× magnified view in side elevation of the structure of FIG. 3.

Referring specifically to FIG. 6, a 4× magnified view in side elevation of miniature virtual image display 50 of FIG. 4 is illustrated for clarity. From this view it can be seen that a first optical lens 67 is affixed directly to the upper surface of substrate 58. An optical prism 70 is mounted to reflect the image from a surface 71 and from there through a refractive surface 72. The image is then directed to an optical lens 75 having a refractive inlet surface 76 and a refractive outlet surface 77. From lens 75 the image is directed to an optical lens 80 having an inlet refractive surface 81 and an outlet refractive surface 82. Also, in this embodiment at least one diffractive optical element is provided on one of the surfaces, e.g. surface 71 and/or surface 76, to correct for aberration and the like. The operator looks into surface 82 of lens 80 and sees a large, easily perceivable virtual image which appears to be behind display 50 (as previously described).

Figure 7:
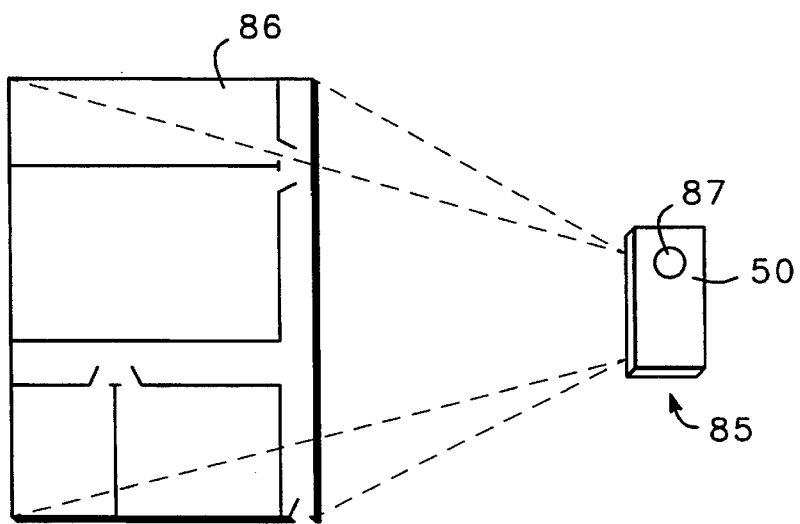
FIG. 7 is a representation of the virtual image seen in the miniature virtual image display of FIG. 3.

FIG. 7 is a perspective view of a hand held communication receiver, which in this specific example is a pager 85 incorporating miniature virtual image display 50 (described above). FIG. 7 illustrates a typical view 86 seen by an operator looking into a viewing aperture 87 of miniature virtual image display 50. View 86 appears to the operator as approximately an 8.5"×11" image which appears to be positioned behind pager 85. View 86 could be, for example, a floor plan of a building about to be entered by the operator (a policeman). The floor plan is on file at the police station and, when assistance is requested by the policeman, the station simply transmits the previously recorded plan. Similarly, miniature virtual image display 50 might be utilized to transmit pictures of missing persons or wanted criminals, maps, extremely long messages, etc. Many other variations, such as silent receiver operation wherein the message appears on display 50 instead of audibly, are possible. Because the images can be transmitted in full color, they are much more pleasing to the eye and a much larger content of information is possible.

Figure 8:
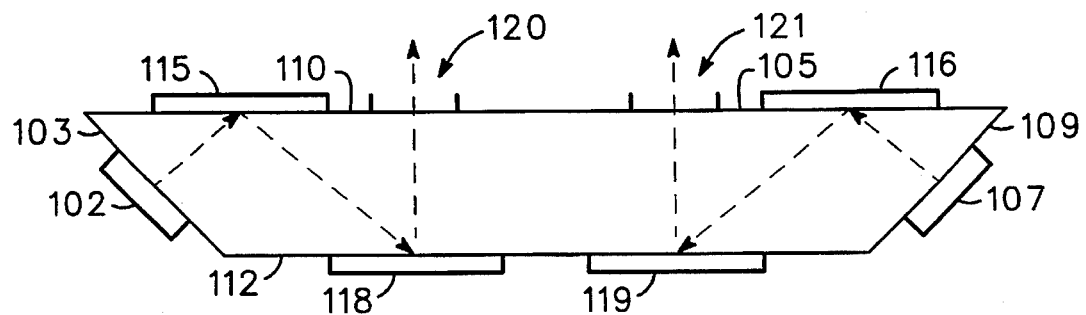
FIG. 8 is a schematic illustration of an image combining structure, for optically combining real images and providing a magnified virtual image.
Figure 9:
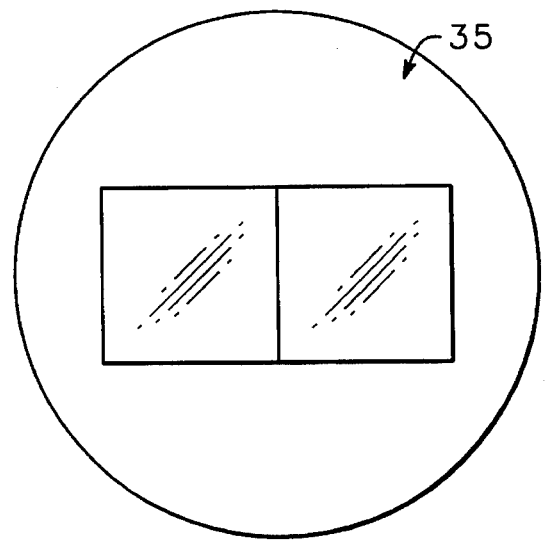
FIG. 9 is a representation of a binocular virtual image seen in the apparatus of FIG. 8.

Referring specifically to FIG. 8, an embodiment of a binocular miniature virtual image display 100 incorporated into a waveguide virtual image display is illustrated schematically. Display 100 includes image generation apparatus 102 affixed to an inlet side 103 of an optical waveguide 105 for providing a first real image thereto. Second image generation apparatus 107 is affixed to a second inlet side 109 of optical waveguide 105 for providing a second real image thereto. Image generation apparatus 102 and 107 can be, for example, a generator similar to those illustrated in FIGS. 1 and 2 and constructed as explained with relation to FIG. 3 (with or without the optics of FIG. 3).

Waveguide 105 is formed generally in the shape of a truncated triangle and includes inlet sides 103 and 109 at opposite ends thereof joined by parallel sides 110 and 112. Side 103 defines one inlet and directs light rays from the real image at apparatus 102 onto a diffractive lens 115 positioned on adjacent side 110. Side 109 defines the second inlet and directs light rays from the real image at apparatus 107 onto a diffractive lens 116 positioned on adjacent side 110. A pair of diffractive lenses 118 and 119 are positioned on adjacent side 112 and receive the images from diffractive elements 115 and 116. Diffractive lenses 118 and 119 then direct the images through a pair of apertures 120 and 121, positioned for binocular viewing, where the magnified virtual images appear as a single, magnified virtual image.

It should be understood that miniature virtual image display 100 could be utilized in a variety of potential embodiments. For example, image generating apparatus 102 and 107 could each provide similar complete images which appear in binocular apertures 120 and 121 to coincide and provide a complete virtual image. Utilizing this method, the virtual image can also incorporate stereoscopic (or 3 D) images. In another embodiment, image generating apparatus 102 and 107 each provide one-half of the complete image in a side-by-side relationship, as illustrated in FIG, 9. In this embodiment the amount of information supplied in the virtual image is doubled.

In a still further embodiment, image generating apparatus 102 and 107 each provide separate complete images with one of the images (e.g. that generated by 102) including, for example, pull-down charts and other operating instructions, or information about the other image (e.g. that generated by 107). Because the eyes of the operator can actually view and perceive separate images with each eye, the two images can provide separate information that it is desirable to view simultaneously. These potential embodiments are given only as examples and it will be understood by those skilled in the art that other combinations and modifications of the disclosed embodiments are possible to provide a great variety of miniature virtual image displays.

Figure 10:
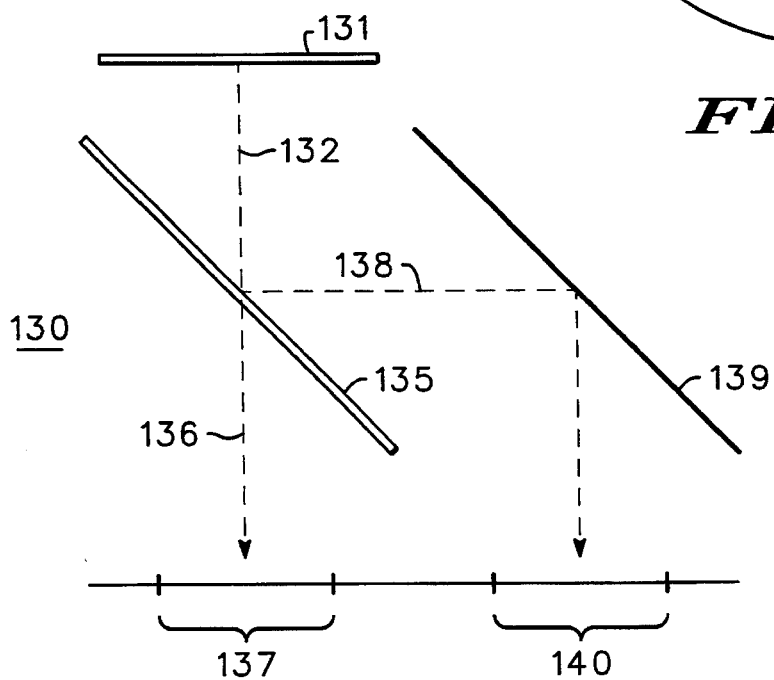
FIG. 10 is a schematic illustration of another binocular imaging structure, for optically separating a real image and providing a magnified binocular virtual image.

Referring specifically to FIG. 10, another embodiment of a binocular miniature virtual image display 130 is illustrated schematically. A semiconductor chip 131 is positioned so that light emanating therefrom (represented by broken line 132) impinges upon a mirror 135. Mirror 135 is a half-silvered image splitter (partially transmissive and partially reflective) which allows the image to pass directly therethrough (represented by broken line 136) to a viewing aperture 137 and, simultaneously, reflects the image (represented by broken line 138) to a second mirror 139. Mirror 139 reflects the image into a second aperture 140 spaced from aperture 137 so as to provide binocular viewing.

Figure 11:
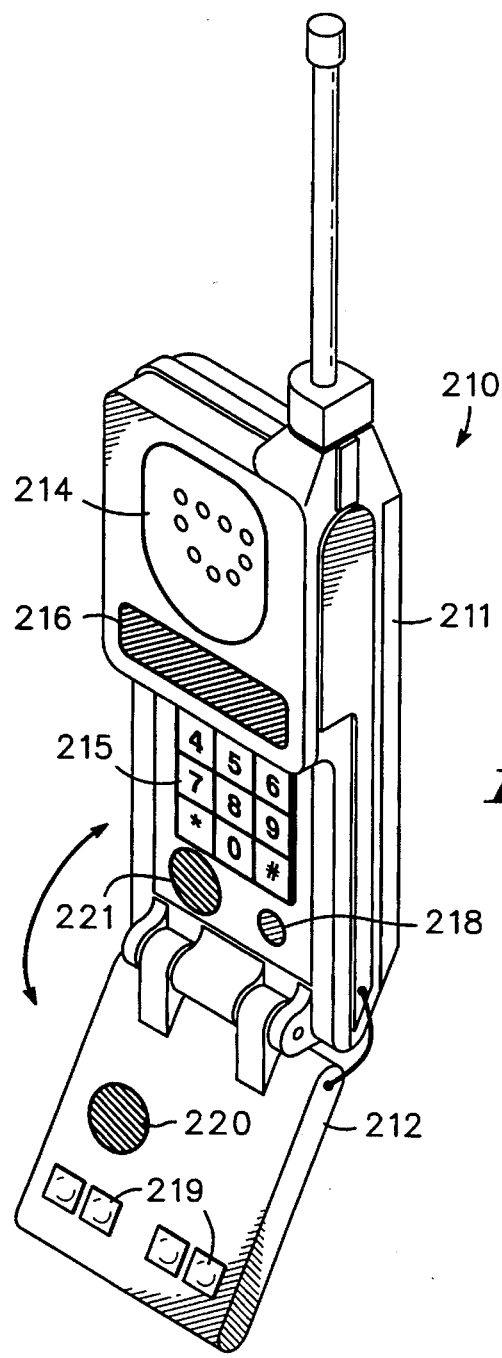
FIG. 11 is a view in perspective of a portable communications receiver embodying the present invention.

FIG. 11, illustrates a portable communication transceiver 210 having a main housing 211 and a partial cover 212. Housing 211 and partial cover 212 are hingedly attached so as to pivot between a closed position (not shown) in which partial cover 212 covers and protects a control panel 215, and an open position in which control panel 215 is accessible for operation of transceiver 210. It will of course be understood that portable communications transceiver 210, which is a data source, can be any of the well known portable communication transceivers, such as a cellular telephone, cordless telephone, two-way radio, data bank, or the like.

In the present embodiment, for purposes of explanation only, portable communication transceiver 210 is a portable cellular telephone. Portable communication transceiver 210 includes control panel 215 for initiating calls and a standard visual display 216, if desired, for indicating the number called, the number calling, etc. Additionally, housing 211 includes a speaker 214 for listening to an audio or a voice communication, as well as having a microphone 218 that is operably coupled to a transmitter. Typically, portable communications transceiver 210 is hand held by an operator so that audio is heard in the ear and the operator can simultaneously talk into microphone 218.

In this embodiment of portable communication transceiver 210, a first viewing aperture 220 is formed in partial cover 212 and a mating viewing aperture 221 is formed in housing 211 and positioned with relation to aperture 220 to provide binocular viewing when partial cover 212 is in the open position (as illustrated). Each of the apertures 220 and 221 have a miniature virtual image display, similar to that disclosed in FIG. 3, associated therewith. The miniature virtual image displays are connected electronically within transceiver 210 and transceiver 210 serves as a data source to provide video to the displays.

A plurality of controls 219 are provided in a convenient area on partial cover 212 and serve to control the images in apertures 220 and 221. For example, the images can be identical to provide the operator with a binocular view of a single image. One or more of controls 219, when properly manipulated, provide information (e.g. pull-down control charts, printed information about the image, control instructions for changing the image, etc.) in the image in one of the apertures. Thus, the operator can use the information provided to control the image, change images or messages, view additional and different information, etc. while viewing a complete image in the other aperture.

Figure 12:
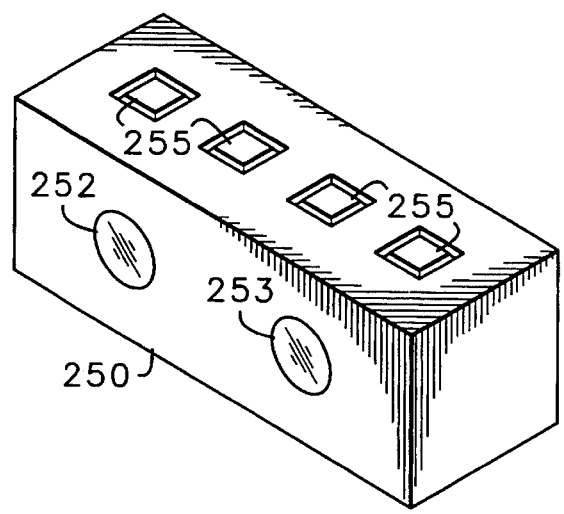
FIG. 12 is a view in perspective of a pager embodying the present invention.

Referring specifically to FIG. 12, a pager 250 is illustrated as a data source or communication receiver. Pager 250 includes a pair of apertures 252 and 253 positioned in a surface thereof and for binocular viewing. Each of the apertures has associated therewith image generation apparatus and a fixed optical system, which may be, for example, similar to the miniature virtual image display illustrated in FIG. 3, and/or the structures in FIGS. 8 and 10, to form a binocular virtual display. As described in conjunction with the previously explained embodiments, the virtual image viewable in each of the apertures 252 and 253 can be similar to provide a binocular view of an image or stereoscopic or 3-D image, or the virtual images in each aperture can be different to provide a larger combined image or different information in each of the apertures.

A plurality of controls are provided on a second surface of pager 250 to provide various functions for pager 250 (e.g. pager OFF/ON, store or recall messages, etc.). Also, controls 255 are connected to provide control of the binocular virtual display and may include such things as controlling the information viewed in each of apertures 252 and 253, display OFF/ON, etc.).

It should be noted that in the prior art, pagers and other small communication receivers in which visual displays are desired are especially handicapped by the size of the displays. Generally such displays are limited to a single short line of text, and the size of the display still dictates the size of the receiver. Utilizing an embodiment of the present invention, a binocular display with several lines to a complete page of text can be incorporated and the size of the receiver or other portable electronic equipment can be substantially reduced. Further, the binocular display is clearer and easier to read and, because it utilizes virtual images, requires very little power for the operation thereof. In fact, the present binocular display uses much less power than any of the direct view displays normally utilized in electronic equipment and, as a result, can be fabricated in much smaller sizes.

Thus a greatly improved portable electronic device with miniature binocular virtual image display is disclosed, which incorporates one or two extremely small LED array or semiconductor chip devices. Each of the miniature virtual displays in a binocular display provides a predetermined amount of magnification, generally greater than 10×, along with sufficient eye relief and lens working distance to create a comfortable and viewable virtual image. Also, a complete virtual image is produced in the binocular display with no moving parts or power consuming motors and the like. Further, because of the novel construction the binocular display is very versatile and can provide a wide and useful selection of virtual images which greatly amplifies the usefulness and versatility of portable data sources including communication receivers.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A portable electronic device with binocular virtual display comprising:

a portable data source; and a miniature binocular virtual image display including a pair of viewing apertures positioned for binocular viewing, image generation apparatus operably attached to the portable data source for receiving data therefrom, the image generation apparatus including a two-dimensional array of LEDs, greater than 100 LEDs by 100 LEDs, for providing, from the received data, a real image including one of a plurality of lines of alphanumerics and graphics, the real image having a luminance of less than approximately 15 fL, and a fixed optical system for producing, from the real image, a pair of virtual images one each perceivable through the pair of viewing apertures.

2. A portable electronic device with binocular virtual display as claimed in claim 1 wherein the light emitting device array includes semiconductor light emitting diodes.

3. A portable electronic device with binocular virtual display as claimed in claim 1 wherein the optical system is further constructed to provide magnification greater than ten.

4. A portable electronic device with binocular virtual display as claimed in claim 1 wherein the portable data source includes a pager.

5. A portable electronic device with binocular virtual display as claimed in claim 1 wherein the two-dimensional array of LEDs is formed on a single semiconductor chip and is further defined by each LED of the plurality of LEDs having an area in the range of 5 to 50 microns on a side.

6. A portable communication receiver with binocular virtual display as claimed in claim 5 wherein the two-dimensional array of LEDs formed on a single semiconductor chip with each LED of the plurality of LEDs utilizing less than approximately 50 µA of current in an ON condition.

7. A portable electronic device with binocular virtual display comprising:

a portable data source; and a miniature binocular virtual image display including a pair of miniature virtual image displays mounted for binocular viewing, each miniature virtual image display having a viewing aperture and image generation apparatus operably attached to the portable data source for receiving data therefrom, the image generation apparatus of each miniature virtual image display including a two-dimensional array of LEDs greater than 100 LEDs by 100 LEDs for providing, from the received data, a real image including one of a plurality of lines of alpha-numerics and graphics, the real image having a luminance of less than approximately 15 fL, and a fixed optical system for producing, from the real image, a virtual image perceivable through the viewing aperture.

8. A portable electronic device with binocular virtual display as claimed in claim 7 wherein the image generation apparatus of each miniature virtual image display includes a two-dimensional array of semiconductor light emitting diodes.

9. A portable electronic device with binocular virtual display as claimed in claim 7 wherein the optical system is further constructed to provide magnification greater than ten.

10. A portable electronic device with binocular virtual display as claimed in claim 7 wherein the portable data source includes a pager.

11. A portable electronic device with binocular virtual display as claimed in claim 7 wherein each of the miniature virtual image displays have a physical size less than approximately 2 cubic inches.

12. A portable electronic device with binocular virtual display as claimed in claim 7 wherein the two-dimensional array of LEDs is formed on a single semiconductor chip and is further defined by each LED of the plurality of LEDs having an area in the range of 5 to 50 microns on a side.

13. A portable electronic device with binocular virtual display as claimed in claim 7 wherein the two-dimensional array of LEDs is formed on a single semiconductor chip with each LED of the plurality of LEDs utilizing less than approximately 50 µA of current in an ON condition.

14. A portable electronic device with binocular virtual display comprising:

a portable data source; and a miniature binocular virtual image display including a pair of miniature virtual image displays mounted for binocular viewing, the miniature binocular virtual image display being electrically connected to the portable data source for receiving data therefrom and each miniature virtual image display of the pair of miniature virtual image displays including a viewing aperture, image generation apparatus including a two dimensional array of light emitting devices for producing a real image including one of graphics and a plurality of lines of alpha-numerics with a luminance of less than approximately 15 fL, and a fixed optical system mounted adjacent the image generation apparatus to receive the real image therefrom, magnify the image and produce a virtual image at the viewing aperture, the optical system producing a magnification more than approximately 10× and sufficient to perceive the virtual image through the viewing aperture.

15. A portable electronic device with binocular virtual display as claimed in claim 14 wherein each of the image generation apparatus providing the real images include a semiconductor light emitting diode array.

16. A portable electronic device with binocular virtual display as claimed in claim 14 including in addition data processing circuitry connected to each of the image generation apparatus providing the real images and to the portable data source, each of the image generation apparatus producing the real images in accordance with data received from the portable communications receiver.

17. A portable electronic device with binocular virtual display as claimed in claim 14 wherein the portable data source is a pager.

18. A portable electronic device with binocular virtual display as claimed in claim 14 wherein each of the miniature virtual image displays have a physical size less than approximately 2 cubic inches.

19. A portable electronic device with binocular virtual display as claimed in claim 18 wherein the two-dimensional array of light emitting devices is formed on a single semiconductor chip and is further defined by each light emitting device of the plurality of light emitting devices having an area in the range of 5 to 50 microns on a side.

20. A portable electronic device with binocular virtual display as claimed in claim 18 wherein the two-dimensional array of light emitting devices is formed on a single semiconductor chip with each light emitting device of the plurality of light emitting devices utilizing less than approximately 50 µA of current in an ON condition.

21. A portable electronic device with binocular miniature virtual display comprising:

a portable data source; and a miniature binocular virtual image display having a pair of viewing apertures positioned on the portable electronic device for binocular viewing, the miniature binocular virtual image display being operably attached to the data source and including image generation apparatus including an LED array formed on a single substrate and defining a plurality of rows and columns of pixels in sufficient number to generate one of a complete picture and several lines of text for providing a real image having a luminance of less than approximately 15 fL, the real image being small enough to require a magnification to be perceivable with the human eye, and a fixed optical system for producing, from the real image, a pair of virtual images magnified by a power of at least ten and viewable through the viewing aperture, the LED array and the optical system of the miniature binocular virtual image display providing a pair of magnified virtual images one each perceivable by an operator in the pair of apertures without substantially effecting the size and power requirements of the portable electronic device.

22. A portable electronic device with binocular virtual display as claimed in claim 21 wherein the LED array includes semiconductor light emitting diodes.

23. A portable electronic device with binocular virtual display as claimed in claim 21 wherein the portable data source includes a pager.

24. A portable communication receiver with binocular virtual display comprising:

a portable communication receiver; and a miniature virtual image display electrically connected to the portable communication receiver and having a pair of viewing apertures positioned on the portable electronic device for binocular viewing, the display including, image generation apparatus including a two dimensional semiconductor device array formed on a semiconductor chip and defining a plurality of rows and columns of pixels in sufficient number to generate one of a complete picture and several lines of text for providing a real image having a luminance less than approximately 15 fL, and an optical system mounted adjacent the image generation apparatus to receive the real image therefrom, magnify the image and produce a pair of virtual images, one each at each of the viewing apertures, the optical system producing a magnification sufficient to perceive the virtual images through the viewing apertures, the semiconductor device array and the optical system of the miniature visual display providing a virtual image perceivable by an operator without substantially effecting the size and power requirements of the portable communication receiver.

25. A portable communication receiver with binocular virtual display as claimed in claim 24 wherein the optical system is constructed to magnify the image by a power of at least ten.

26. A portable communication receiver with binocular virtual display as claimed in claim 24 wherein the semiconductor device array formed on a single semiconductor chip and defining a plurality of rows and columns of pixels is further defined by each pixel of the plurality of pixels having an area in the range of 5 to 50 microns on a side.

27. A portable communication receiver with binocular virtual display as claimed in claim 26 wherein the semiconductor device array formed on a semiconductor chip and defining a plurality of rows and columns of pixels is further defined by at least one semiconductor device in each pixel and the semiconductor device array is formed on a single semiconductor chip with each pixel of the plurality of pixels utilizing less than approximately 50 μA of current in an ON condition.

28. A portable electronic device with binocular miniature virtual display comprising:

a portable data source; and a miniature virtual image display having a pair of viewing apertures positioned on the portable electronic device for binocular viewing, the display being operably attached to the data source for visually displaying data received from the data source and including image generation apparatus, the image generation apparatus including a two dimensional LED array formed on a single substrate and defining a plurality of rows and columns of pixels in sufficient number to generate a real image of one of a complete picture and several lines of text, the real image having a luminance of less than approximately 15 fL and requiring magnification to be perceivable with the human eye, a fixed optical system for producing, from the real image, a pair of magnified virtual images one each viewable and perceivable by an operator through the pair of viewing apertures; and the LED array and the optical system of the miniature visual display providing a virtual image perceivable by an operator without substantially effecting the size and power requirements of the portable electronic device.

29. A portable electronic device with binocular miniature virtual display as claimed in claim 28 wherein the real image is small enough to require at least a power of ten magnification to be perceivable with the human eye and the fixed optical system is designed to produce a magnified virtual image greater than ten times the real image.

30. A portable electronic device with binocular miniature virtual display as claimed in claim 28 wherein the real image is small enough to require a power of twenty magnification to be fully perceivable with the human eye and the fixed optical system is designed to produce a magnified virtual image twenty times the real image.

31. A portable electronic device with binocular virtual display as claimed in claim 28 wherein the LED array formed on a single substrate and defining a plurality of rows and columns of pixels is further defined by at least one LED in each pixel and the LED array is formed on a single substrate with each pixel of the plurality of pixels utilizing less than approximately 50 μA of current in an ON condition.

* * * * *